(12) United States Patent  
Kimura et al.

(10) Patent No.: US 8,184,289 B2
(45) Date of Patent: May 22, 2012

(54) SPECTRAL COLORIMETRIC APPARATUS AND COLOR IMAGE FORMING APPARATUS USING THE SAME

(75) Inventors: Kazumi Kimura, Toda (JP); Masayasu Teramura, Utsunomiya (JP); Nobuyuki Tochigi, Kawaguchi (JP); Tokuji Takizawa, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 118 days.

(21) Appl. No.: 12/769,282

(22) Filed: Apr. 28, 2010

(65) Prior Publication Data

US 2010/0277730 A1    Nov. 4, 2010

(30) Foreign Application Priority Data

Apr. 30, 2009 (JP) .................................. 2009-110878
Mar. 31, 2010 (JP) .................................. 2010-081566

(51) Int. Cl.
  *G01J 3/28* (2006.01)

(52) U.S. Cl. ....................................................... 356/326

(58) Field of Classification Search .................. 356/326, 356/328
See application file for complete search history.

(56) References Cited

U.S. PATENT DOCUMENTS

| 4,540,282 | A | * | 9/1985 | Landa et al. | .................. | 356/328 |
| 6,606,156 | B1 |  | 8/2003 | Ehbets et al. | | |

FOREIGN PATENT DOCUMENTS

| EP | 0 440 443 A2 | 8/1991 |
| JP | 6-050814 A | 2/1994 |
| JP | 6-058812 A | 3/1994 |
| JP | 6-094528 A | 4/1994 |
| JP | 9-160343 A | 6/1997 |
| JP | 2000-298066 A | 10/2000 |
| JP | 2001-264173 A | 9/2001 |
| JP | 2002-206967 A | 7/2002 |
| JP | 2004-126278 A | 4/2004 |

OTHER PUBLICATIONS

Takizawa, Tokuji et al. "Spectral Colorimetric Apparatus and Image Forming Apparatus Using the Same", Specification and Drawings of unpublished related co-pending U.S. Appl. No. 12/769,247, filed Apr. 28, 2010. pp. 1-46.

* cited by examiner

*Primary Examiner* — Tarifur Chowdhury
*Assistant Examiner* — Abdullahi Nur
(74) *Attorney, Agent, or Firm* — Rossi, Kimms & McDowell LLP

(57) ABSTRACT

A spectral colorimetric apparatus for detecting a color of an image of a test subject illuminated includes a stop; a spectral detection optical system for spectrally detecting a beam diffused in the test subject and passing through the stop; and a guiding optical system for guiding, toward the stop, the beam diffused in the test subject, wherein in a first section which is a section including an optical axis of the guiding optical system, condensing positions of the light beam condensed by the guiding optical system change depending on a position in a direction orthogonal to the first section, and the stop is disposed between condensing positions closest to and farthest from the guiding optical system, of condensing positions, in the first section, of the beam condensed by the guiding optical system, in a direction of the optical axis of the guiding optical system.

14 Claims, 7 Drawing Sheets

# SPECTRAL COLORIMETRIC APPARATUS AND COLOR IMAGE FORMING APPARATUS USING THE SAME

BACKGROUND OF THE INVENTION

1. Field of the Invention

The present invention relates to a spectral colorimetric apparatus using a diffraction grating for color recognition or colorimetry on a test subject and, more particularly, is suitable for a spectral colorimetric apparatus performing colorimetry on toner or printing media in an image forming apparatus.

The present invention may be applied not only to the image forming apparatus but also to a spectral colorimetric apparatus such as a white balance sensor for a digital camera, and other colorimetric apparatus.

2. Description of the Related Art

In an image forming apparatus for forming a color image through an electrophotographic process, a deviation in color tone may occur because of color mixing of toner. The same problem occurs not only in the electrophotographic type image forming apparatus but also in a general image forming apparatus for forming a color image such as an ink-jet type image forming apparatus. In order to solve the problems as described above, Japanese Patent Application Laid-Open No. H09-160343 proposes a method of measuring a spectral reflection light quantity of a toner image using two different spectral filters and correcting an image signal based on the result of the measurement. Similarly, Japanese Patent Application Laid-Open No. 2004-126278 proposes an image forming apparatus for performing color tint correction on a color image. In the electrophotographic type image forming apparatus according to Japanese Patent Application Laid-Open No. 2004-126278, a sensor for detecting color tint is provided in the downstream of a fixing device located on a fixing and conveying path to detect RGB output values of colors of a mixed color patch image formed on a transferring material (printed image) moving along the conveying path.

In order to determine the color tone at higher precision, it is necessary to increase the number of spectral wavelength bands to at least three, which corresponds to the number of primary colors. When the number of wavelength bands may be further increased, the color tone may be determined at higher precision.

In order to increase the number of wavelength bands, there have been proposed a large number of diffraction spectral devices for performing spectral measurement based on a diffraction phenomenon, for example, in Japanese Patent Application Laid-Open No. 2000-298066, Japanese Patent Application Laid-Open No. H06-058812, Japanese Patent Application Laid-Open No. 2002-206967, and Japanese Patent Application Laid-Open No. H06-094528.

When the diffraction spectral colorimetric device is used, there have been problems that still remain to be solved.

FIG. 12 illustrates a Rowland type diffraction spectral colorimetric device generally used as a conventional diffraction spectral colorimetric device.

A detection light beam which is scattering light from a test subject illuminated by an illumination optical system (not shown) is incident on a detection optical apparatus from an incident window 208. The detection light beam is spectrally separated by a concave surface reflection type diffraction element 204 and then obtained as a spectral intensity distribution by a one-dimensional array detector (one-dimensional array light receiving element) 203. In a case of employing such a structure, a size of the incident window 208 through which the detection light beam enters should be sufficiently small, otherwise there occurs a problem that spectral resolution on the one-dimensional array detector 203 may not be sufficiently high. In order to solve the problem, there is an example in which a stop is provided as the incident window as described in Japanese Patent Application Laid-Open Nos. H06-058812 and 2002-206967.

In the case of the Rowland type diffraction spectral colorimetric device, imaging magnification of the stop on the array detector which is obtained by the diffraction grating is equal-magnification, and hence it is desirable to prepare a stop having a width substantially equal to a width of each of light receiving elements arranged in an arrangement direction on the array detector. In Japanese Patent Application Laid-Open No. H06-058812, the test subject and the stop are made conjugate with each other to image a detection light beam from the test subject on the stop through a mirror and an imaging lens. Such an imaging improves the light use efficiency. According to Japanese Patent Application Laid-Open No. 2002-206967, a detection light beam emerged from an optical fiber is imaged on a stop by an imaging lens.

In the case of the Rowland type diffraction spectral colorimetric device, the relative positions of the stop, the diffraction grating, and the array detector should be aligned with high precision, otherwise the image of the stop blurs on the array detector, and hence sufficient spectral performance cannot be obtained. In view of this, Japanese Patent Application Laid-Open No. H06-094528 discloses an exemplary case of performing focus adjustment by moving a mirror provided between the diffraction grating and the array detector. However, there arises a problem that the number of parts increases in the case of providing a mirror between the diffraction grating and the array detector.

To solve the problem, focus adjustment may be performed by finely adjusting the stop forward and backward. However, in the diffraction spectral colorimetric device in which the detection light beam is condensed on the stop as described in Japanese Patent Application Laid-Open No. 2002-206967 and Japanese Patent Application Laid-Open No. H06-094528, there arises another problem that a light beam passing through the stop changes to vary the quantity of received light reaching the array detector when the stop is moved forward and backward in the optical axis direction. When the quantity of received light varies during the focus adjustment, precise adjustment is made difficult.

Even when the focus adjustment is performed by the system described in Japanese Patent Application Laid-Open No. H06-094528, there arises still another problem that a light beam passing through the stop increases or decreases to vary the quantity of received light reaching the array detector in the case where deviations occur in alignment precision of the stop and in part precision and alignment precision of a light guide element.

In the image forming apparatus for forming the color image through the electrophotographic process as described in Japanese Patent Application Laid-Open No. 2004-126278, it is necessary to read the mixed color patch image on the transferring material (printed image) moving along the conveying path. It is known that the transferring material (printed image) moving along the conveying path vibrates in a direction (upward and downward direction) perpendicular to the conveying direction during the movement. In particular, when a moving speed is fast (printing speed is fast), the vibration becomes significant. In the optical system in which the detection surface and the stop are made conjugate with each other as described in Japanese Patent Application Laid-Open No. H06-058812, when the printed image corresponding to the detection surface vibrates upward and downward (in optical axis direction), the conjugate relationship changes, and hence the focal point on the stop is shifted. That is, there arises further another problem that, a deviation of the focal point of the detection light beam condensed on the stop occurs, and hence a light beam passing through the stop increases or decreases to vary the quantity of received light reaching the array detector, to thereby reduce detection precision.

SUMMARY OF THE INVENTION

A first object of the present invention is to reduce a variation in quantity of a light beam passing through a stop, which is caused by position precision of the stop, to thereby improve detection precision of a spectral colorimetric device. A second object of the present invention is to reduce a variation in quantity of a light beam passing through a stop while a printed image corresponding to a detection surface moves upward and downward, to thereby improve detection precision of a spectral colorimetric device.

According to one aspect of the invention, a spectral colorimetric apparatus for detecting a color of an image of a test subject illuminated includes: a stop; a spectral detection optical system for spectrally detecting a light beam which is diffused in the test subject and passes through the stop; and a guiding optical system for guiding, toward the stop, the light beam diffused in the test subject, wherein in a first section which is a section including an optical axis of the guiding optical system, condensing positions of the light beam condensed by the guiding optical system change depending on a position in a direction orthogonal to the first section, and the stop is disposed between a condensing position closest to the guiding optical system and a condensing position farthest from the guiding optical system, of condensing positions, in the first section, of the light beam condensed by the guiding optical system, in a direction of the optical axis of the guiding optical system.

According to further aspect of the invention in the spectral colorimetric apparatus, providing a second section being a section orthogonal to the first section and is parallel to the optical axis, the guiding optical system includes an anamorphic optical surface in which a power in the first section is larger than a power in the second section.

According to further aspect of the invention in the spectral colorimetric apparatus, the anamorphic optical surface of the guiding optical system comprises a cone surface in which a curvature in the first section changes along a longitudinal direction of the stop.

According to further aspect of the invention in the spectral colorimetric apparatus, the anamorphic optical surface of the guiding optical system comprises a cylindrical surface having a constant curvature in the first section; and the anamorphic optical surface is tilted relative to a light beam entering the anamorphic optical surface in the second section.

According to further aspect of the invention in the spectral colorimetric apparatus, the following condition is satisfied:

$$0.58 < L/LS < 1.73,$$

where L (mm) indicates a distance between a condensing position closest to the guiding optical system and a condensing position farthest from the guiding optical system, of condensing positions, in the first section, of the light beam condensed by the guiding optical system, in the direction of the optical axis of the guiding optical system, and LS (mm) indicates a length of the stop in a longitudinal direction.

According to further aspect of the invention in the spectral colorimetric apparatus, the guiding optical system comprises a light guide element integrally including an incident refractive surface, a total reflective surface, and an exit refractive surface, which are provided in order from the test subject.

According to further aspect of the invention in the spectral colorimetric apparatus, the total reflective surface comprises an anamorphic reflective surface in which a power in the first section is larger than a power in the second section.

According to further aspect of the invention in the spectral colorimetric apparatus, the incident refractive surface has a power larger than a power of the exit refractive surface.

According to further aspect of the invention in the spectral colorimetric apparatus, the test subject is located in a front focal position of the incident refractive surface.

According to further aspect of the invention in the spectral colorimetric apparatus, the guiding optical system has a power in a second section which is parallel to a longitudinal direction of the stop and the optical axis of the guiding optical system, smaller than a power in a first section which is orthogonal to the longitudinal direction of the stop; condensing positions of the light beam condensed by the guiding optical system in the first section change depending on a position in the longitudinal direction of the stop; and the stop is disposed between a condensing position closest to the guiding optical system and a condensing position farthest from the guiding optical system, of condensing positions, in the first section, of the light beam condensed by the guiding optical system in the direction of the optical axis of the guiding optical system.

According to further aspect of the invention in the spectral colorimetric apparatus, the spectral colorimetric apparatus further includes an illumination optical system for illuminating the test subject; and an analyzing unit, wherein: the spectral detection optical system comprises: a spectral optical element for spectrally separating the light beam passing through the stop; and a one-dimensional array light receiving element for receiving the spectral light beam from the spectral optical element; the one-dimensional array light receiving element detects a spectral intensity of the spectral light beam in a predetermined wavelength range and converts the spectral intensity into an electrical signal; and the analyzing unit obtains chromaticity of the test subject based on the detected spectral intensity.

According to another aspect of the invention, a color image forming apparatus includes the spectral colorimetric apparatus set out in the foregoing, and a control unit for correcting an image signal based on a detection result obtained by the spectral colorimetric apparatus.

According to the present invention, the detection light beam reflected on the test subject may be efficiently condensed on the stop and a variation in quantity of the light beam passing through the stop may be reduced even in a case where the stop is shifted in the optical axis direction, and hence stable detection precision maybe ensured.

Further features of the present invention become apparent from the following description of exemplary embodiments with reference to the attached drawings.

DESCRIPTION OF THE EMBODIMENTS

Preferred embodiments of the present invention will now be described in detail in accordance with the accompanying drawings.

<Embodiment 1>

(Spectral Colorimetric Apparatus Using Light Guide Element)

In this embodiment, a spectral colorimetric apparatus using a spectral reflection type diffraction element is described.

Figure 1:
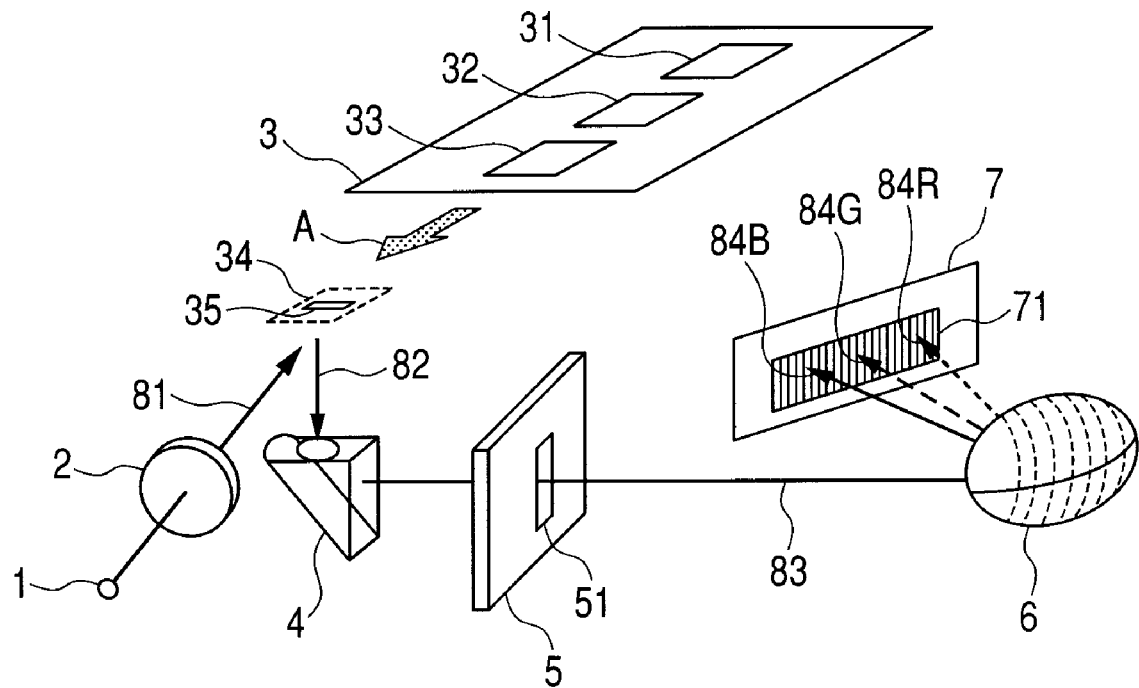
FIG. 1 is a perspective view illustrating a spectral colorimetric apparatus according to Embodiment 1 of the present invention.
Figure 2:
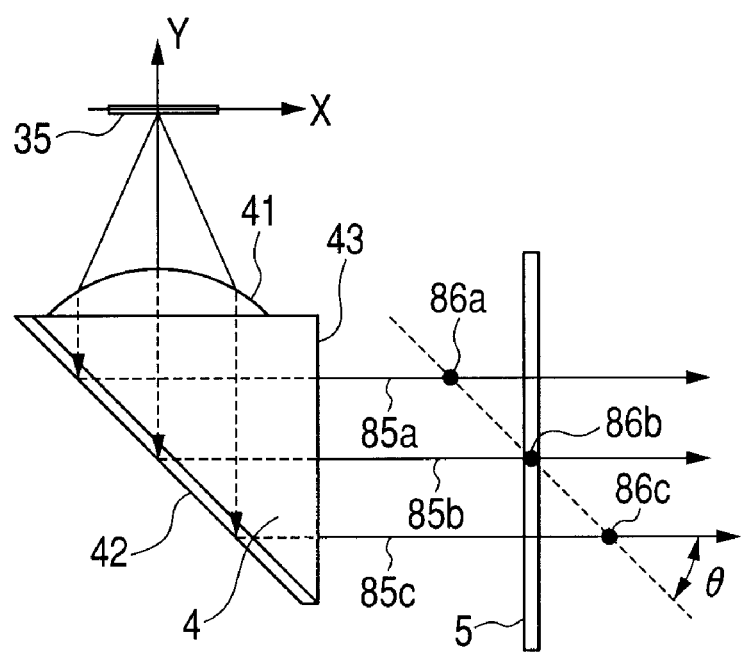
FIG. 2 is an explanatory view illustrating a light guide element according to Embodiment 1 of the present invention.
Figure 3:
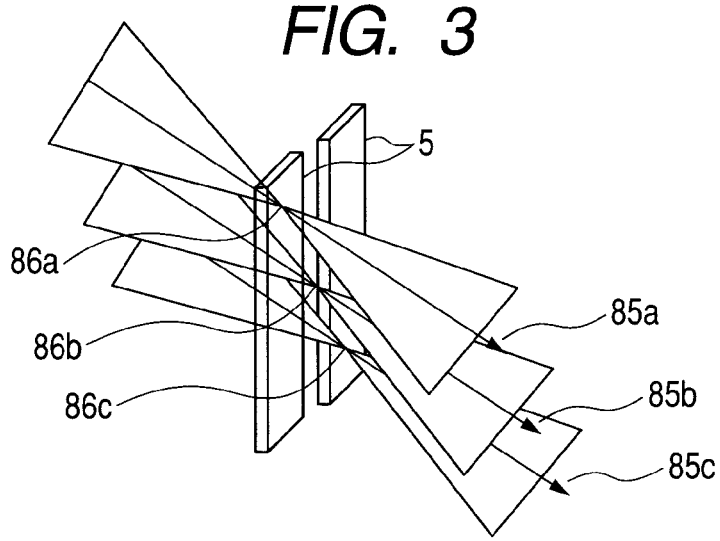
FIG. 3 is a principal perspective view illustrating Embodiment 1 of the present invention.

FIG. 1 is a perspective view illustrating a spectral colorimetric apparatus using a single light guide element as a guiding optical system in which an incident refractive surface, total reflective surface and exit refractive surface are integrally formed, according to Embodiment 1 of the present invention. FIG. 2 is a principal sectional view illustrating the light guide element. FIG. 3 is a principal perspective view illustrating the light guide element. FIGS. 4A, 4B, 5A and 5B are explanatory diagrams illustrating effects of the present invention. FIGS. 6A and 6B are explanatory views illustrating a Rowland type spectral device.

The spectral colorimetric apparatus according to this embodiment includes a spectral detection optical system and a guiding optical system for guiding a light beam from a test subject to the spectral detection optical system. The spectral colorimetric apparatus has a Rowland type spectral device structure which is a simple structure as illustrated in FIG. 6A and effective for a reduction in size. When an incident stop 5 and a concave surface reflection type diffraction element 6 are provided on a Rowland circle 60, diffracted light is condensed on the same Rowland circle and imaged onto a position determined according to a wavelength. A one-dimensional array detector (one-dimensional array light receiving element) 7 is provided on the position, a spectral intensity distribution may be obtained at the same time.

As illustrated in FIG. 6B, the concave surface reflection type diffraction element 6 includes a large number of fine blaze diffraction gratings 62 provided on a curved base surface 61.

In FIG. 1, reflection light 82 from a test subject illuminated by a light beam 81 emitted from an illumination apparatus including a light source 1 and a condensing element 2 is guided to the incident stop 5 through a light guide element 4. Light passing through the incident stop 5 is spectrally separated and condensed by the concave surface reflection type diffraction element 6 which is a spectral optical element, and then imaged for each wavelength in a predetermined wavelength range on the one-dimensional array detector 7 to form a stop image.

The one-dimensional array detector 7 converts a light quantity for each wavelength into an electrical signal, and transmits the electrical signal to an analyzing apparatus (not shown) which is an analyzing unit. The analyzing apparatus obtains chromaticity of the test subject from an internal table based on the input spectral intensity information.

Desired color patches (patches for chromaticity detection) 31, 32, and 33 are printed on the test subject 3 to be subjected to the determination of a color tint. The illumination apparatus for illuminating the color patches includes the light source 1 and the condensing element 2. The test subject including the color patches 31, 32, and 33 is sequentially moved by an image conveying apparatus (not shown) in a direction indicated by an arrow "A" to reach an illumination area 34, where the test subject is illuminated.

In this embodiment, a white light emitting diode (white LED) is used as the light source 1. An LED generally has a predetermined orientation characteristic based on an element structure thereof. Therefore, the condensing element 2 is employed to improve illumination efficiency, to thereby uniformly illuminate the test subject 3 and reduce a variation in light quantity due to the rising of the test subject 3.

The condensing lens 2 is a plastic lens and manufactured by injection molding. The condensing lens 2 causes an illumination light beam to illuminate the illumination area 34.

The light guide element 4 guides, to the stop 5, the light which reaches the illumination area 34 and is reflected on the test subject 3. A read region 35 of the illumination area 34 is a region which is long and narrow in a direction perpendicular to the moving direction (arrow "A") of the test subject 3.

FIG. 2 illustrates a detailed shape of the light guide element 4. The light guide element 4 has an incident surface (incident refractive surface) 41 having a convex spherical shape, a cylindrical total reflective surface 42 having a concave shape, and an exit surface (exit refractive surface) 43 having a flat shape. An optical path is bent by the total reflective surface 42 in a section parallel to a paper sheet (hereinafter referred to as second section). The total reflective surface 42 has a cylindrical shape which has no power in the second section parallel to the paper sheet and has a power in a section orthogonal to the paper sheet and parallel to the optical axis (hereinafter referred to as first section).

The light guide element 4 is a condensing element which exhibits a condensing action in a direction parallel to the spectral direction and has an anamorphic power. The light guide element 4 has a function for condensing, on the stop 5, the light beam diffused in the read region 35 to form a substantially linear image. As in the case of the condensing element 2, the light guide element 4 is made of plastic. A plastic material to be used is desirably an existing optical resin material such as acrylic, polycarbonate, or polyolefin resin. In order to increase dust resistance, a cover glass (not illustrated in FIG. 1) may be provided between the condensing element 2 and the test subject 3 or between the test subject 3 and the light guide element 4. The cover glass having a low transmittance in an ultraviolet region smaller than 380 nm can be adopted as long as a transmittance in a visible light region equal to or larger than 380 nm exceeds 90%. It is important to determine the transmittance based on a wavelength region to be read.

The light passing through the stop 5 is spectrally separated and condensed by the concave surface reflection type diffraction element 6, and then imaged for each wavelength on the one-dimensional array detector 7 to obtain the stop image. FIG. 1 illustrates light beams 84B, 84G, and 84R of typical three colors as spectral first-order diffraction light beams. In an actual case, light beams other than the light beams of typical three colors also reach the one-dimensional array detector 7.

A Si photo diode array is generally used as the one-dimensional array detector 7. Multiple light receiving pixels 71 are laterally arranged in the one-dimensional array detector 7. Each of the light receiving pixels 71 outputs, as a detection signal, an intensity of the stop image obtained by condensing for each wavelength. The detection signal is detected as a signal corresponding to each wavelength by a signal processing circuit (not shown). In view of the structure of the Si photo diode array, spectral sensitivity in a region close to a near-infrared region is high and the spectral sensitivity reduces as the wavelength shortens. The signal processing circuit has a structure capable of generating a processing signal in consideration of the spectral sensitivity of the Si photo diode array.

The function of the stop 5 is to determine a shape of an image formed on the one-dimensional array detector 7. The image of the stop 5 for each color is formed on the light receiving pixel 71 of the one-dimensional array detector 7.

Therefore, the light receiving pixel 71 of the one-dimensional array detector 7 and the stop 5 are desirably made similar in shape to each other. In Embodiment 1, the stop 5 has a rectangular shape which is long in a first direction.

When a width of the stop 5 having the rectangular shape (stop length in shorter side direction) is too large, detection precision reduces (hereinafter, the direction of the width is referred to as short direction). In other words, when the width of the image of the stop 5 formed on the light receiving pixel 71 of the one-dimensional array detector 7 thickens, the light having a wavelength is received by plural of light receiving pixels 71, and hence the detection precision reduces.

Wavelength resolution is determined based on the length (width) of the light receiving pixel 71 of the one-dimensional array detector 7 in the spectral direction (arrangement direction). Therefore, when the width is narrowed, the wavelength resolution may be improved.

In FIG. 1, a length (height) of the light receiving pixel 71 in a direction orthogonal to the arrangement direction thereof may be set larger than the width of the light receiving pixel 71. This reason is that, light is not spectrally separated in the height direction of the light receiving pixel 71, and hence the detection precision and the wave resolution are not affected by the length (height).

When the height of the light receiving pixel 71 is set large and the height of the stop 5 (in direction orthogonal to width, hereinafter referred to as the longitudinal direction) is set large, the quantity of light received on the light receiving pixel 71 may be increased. Therefore, a high-sensitive spectral device capable of detecting a small quantity of light may be obtained. When the high-sensitive spectral device may be obtained, the quantity of light from the light source 1 illuminating the color patches may be reduced to reduce power.

As illustrated in FIG. 6B, the concave surface reflection type diffraction element 6 includes the blaze diffraction gratings 62 provided on an anamorphic optical surface (base surface) 61 having curvatures different between in the Y-direction and the Z-direction.

The incident stop 5, the concave surface reflection type diffraction element 6, and the one-dimensional array detector 7 serve as a spectral detection optical system. In the Rowland type spectral device structure, the concave surface reflection type diffraction element generally includes a spherical surface which is a base surface. Therefore, there is a problem that, imaging states in the spectral direction and a direction orthogonal to the spectral direction are significantly different from each other, and hence large astigmatism occurs to degrade imaging performance, to thereby reduce the resolution of the spectral device. This problem occurs in principle and thus cannot be completely eliminated. However, when the curvatures of the concave surface reflection type diffraction element in the spectral direction and the direction orthogonal to the spectral direction are set different from each other (that is, anamorphic surface), an image plane tilt in the direction orthogonal to the spectral direction may be changed between a short wavelength and a long wavelength. Therefore, necessary and sufficient imaging performance may be obtained. Thus, the base surface of the concave surface reflection type diffraction element is provided as the anamorphic surface.

The concave surface reflection type diffraction element 6 is manufactured as follows. A plastic optical element is formed by injection molding using a mold and a reflective film made of Al and the like and a reflection coating made of $SiO_2$ and the like are formed on the plastic optical element by vapor deposition. The concave surface reflection type diffraction element may be manufactured by performing direct ion beam processing or existing lithography processing on an optical substrate such as a quartz substrate.

The concave surface reflection type diffraction element 6 is described in detail.

FIG. 6B is a sectional diagram illustrating the concave surface reflection type diffraction element 6 in the spectral direction. A large number of fine blaze diffraction gratings 62 are provided on the anamorphic optical surface 61 serving as a base surface. (Note that the blaze diffraction gratings 62 are described exaggeratedly.)

Tables 1 and 2 illustrate various specifications of the spectral device and the shape of the concave surface reflection type diffraction element 6 in this embodiment.

TABLE 1

(Spectral Device Specifications)

| | |
|---|---|
| Spectral range | 380 nm to 730 nm |
| Light source | Ultraviolet LD excitation type white LED |
| Stop width | 60 μm |
| Detection element | Si photo diode array |
| Order of diffraction m | 1 |
| Pixel pitch of element | 25 μm |
| Wavelength resolution | 3.3 nm |

TABLE 2

(Diffraction Element Specifications)

| | |
|---|---|
| Base meridional line curvature radius [mm] | 17.5 |
| Base sagittal line curvature radius [mm] | 15.45 |
| Grating pitch P [μm] | 2.52 |
| Grating height h [μm] | 0.52 |

TABLE 2-continued (Diffraction Element Specifications)

| | |
|---|---|
| Incident angle α [°] | 12 |
| Reflective film | Al-based multilayer film |
| Effective diameter [mm] | 7 |

The Rowland type spectral device is used, and hence a Rowland circle diameter is 8.75 mm and a curvature radius of a meridional line of the anamorphic base surface of the diffraction grating within a plane including the Rowland circle is 17.5 mm. A curvature radius of a sagittal line orthogonal to the meridional line is 15.45 mm. An effective diameter is 7 mm and NA is 0.4.

Blaze diffraction gratings of a diffraction element are generally single-layer diffraction gratings, and hence the diffraction efficiency is maximum at a blaze wavelength and gradually reduces as the blaze wavelength changes toward the short-wavelength side and the long-wavelength side. Therefore, when the diffraction grating shape is set such that a wavelength close to a minimum wavelength in a detection wavelength band of the spectral device is the blase wavelength, the problem described above may be solved.

The same may be expected even when a grating height h of the diffraction gratings is set.

The concave surface reflection type diffraction element 6 is manufactured by injecting a resin into a mold formed by cutting. Alternatively, the concave surface reflection type diffraction element may be manufactured by directly cutting a base material. Alternatively, the concave surface reflection type diffraction element may be manufactured by a transfer method of pressing molten glass to a mold formed by cutting. In order to improve reflection efficiency, an Al-based multilayer film may be provided on a grating surface.

In FIG. 6A, there is a case where the stop image of the stop 5 blurs on the one-dimensional array detector 7 because of alignment precision among the stop 5, the concave surface reflection type diffraction element 6, and the one-dimensional array detector 7 and precision of the curvature radius of the concave surface reflection type diffraction element 6. Therefore, it is necessary to shift the stop 5 in the optical axis direction to perform focus adjustment. The stop 5 may be held by a holder (not shown) and shifted in the optical axis direction.

Next, the structure and function of the light guide element 4 serving as the guiding optical system are described with reference to FIGS. 2 to 5.

As illustrated in FIG. 2, an intersection of a section of the read region 35 and the optical axis is set as an origin, and a direction along the optical axis from the cylindrical total reflective surface 42 to the read region 35 are defined as a Y-axis direction. A direction which is perpendicular to the moving direction (direction indicated by arrow "A" in FIG. 1) of the test subject 3 in a section including the read region 35 and directed to the exit surface 43 side is defined as an X-axis direction. Table 3 illustrates specifications of surface position coordinates and curvatures of the incident surface 41, the cylindrical total reflective surface 42, the exit surface 43, and the stop 5 in the case where the X- and Y-coordinate systems are defined as described above.

TABLE 3

Specifications of Light Guide Element PMMA

| | Surface coordinates | Curvature in paper sheet plane | Curvature in plane orthogonal to paper sheet |
|---|---|---|---|
| Read region 35 | (0.0, 0.0) | ∞ | |
| Incident surface 41 | (0.0, −6.2) | | 3.85 |
| Cylindrical total reflective surface 42 | (0.0, −9.0) | ∞ | 10.3 |
| Exit surface 43 | (2.1, −9.0) | ∞ | |
| Stop 5 | (4.1, −9.0) | ∞ | |

Note that values are in mm. A cover glass (not shown) having a thickness of 0.7 mm is provided between the read region 35 and the incident surface 41. An aperture width (lateral direction) of the stop is set to 60 μm and an aperture length (longitudinal direction) thereof is set to 2 mm. As illustrated in FIG. 2, the origin (0, 0) is the intersection of the X-axis and the Y-axis.

An optical effective area of each optical element is desirably set such that an NA of an exit light beam of the light guide element 4 and an NA of an incident light beam of the spectral detection optical system in the first section are substantially equal to each other, so as to determine a suitable element size for minimizing a light beam energy loss.

In this embodiment, the incident-side NA of the spectral detection optical system in the first section is equal to 0.4, and hence optical effective areas of the incident surface 41, the cylindrical total reflective surface 42, and the exit surface 43 are set such that the incident-side NA of the light guide element is equal to 0.4.

The light guide element 4 has a condensing action for making reflected light beams from the read region 35 substantially parallel by the incident surface 41 having the convex spherical shape. That is, a front focal position of the incident surface 41 and the read region 35 are substantially aligned with each other. Note that "substantially aligned" means that the read region 35 is provided in a position within ±20% of a front focal length of the incident surface 41.

As illustrated in FIG. 2, of the reflected light beams from the test subject 3, a principal ray in the paper sheet plane is expressed by reference symbol 85b and marginal rays are expressed by 85a and 85c. The light beams 85a, 85b, and 85c are totally reflected on the cylindrical total reflective surface 42 provided at 45° relative to the light beams.

The cylindrical total reflective surface 42 is an anamorphic concave cylindrical surface having a curvature only in a plane which is orthogonal to the paper sheet and parallel to the optical axis. The cylindrical total reflective surface 42 has no power in the second section parallel to the paper sheet and has a power in the first section which is orthogonal to the paper sheet and parallel to the optical axis. That is, the cylindrical total reflective surface 42 is an anamorphic surface having a power in the first section stronger than that in the second section. The optical path is bent by 90 degrees by the cylindrical total reflective surface 42 in a second section parallel to the paper sheet. As a result, the incident light beams converted into substantially parallel light by the incident surface 41 located closer to the test subject side than the anamorphic surface are condensed only in the first section orthogonal to the paper sheet and parallel to the optical axis and bent in the second section parallel to the paper sheet without being subjected to the condensing action in the second section.

The exit surface 43 is the flat surface and transmits, toward the stop 5, the light beams 85a, 85b, and 85c reflected on the cylindrical total reflective surface 42. Therefore, the incident surface 41 has a power stronger than that of the exit surface 43.

As described above, the light guide element guides, toward the stop 5, the light beams converted into the substantially parallel light by the incident surface 41 without condensing the light beams in the second section parallel to the paper sheet while maintaining the parallel light. The light guide element 4 is configured to have the condensing action by the cylindrical total reflective surface 42 in the first section which is orthogonal to the paper sheet and parallel to the optical axis, so as to condense the light beam in the vicinity of the stop 5.

The light beams 85a, 85b, and 85c reflected on the cylindrical total reflective surface 42 are subjected to the same condensing action by the cylindrical total reflective surface 42 having the concave shape. However, distances between the stop 5 and reflection points of the respective light beams on the cylindrical total reflective surface 42 are different from one another. Therefore, as illustrated in FIG. 3, condensing positions 86a, 86b, and 86c of the light beams 85a, 85b, and 85c are different from one another in the optical axis direction.

As illustrated in FIG. 3, the condensing position 86a of the marginal ray 85a is closest to the light guide element 4 and the condensing position 86c of the marginal ray 85c is farthest from the light guide element 4. The stop 5 is provided between the closest condensing position 86a and the farthest condensing position 86c.

The light beams are transmitted toward the stop 5 without being condensed in the second section while maintaining the parallel state. Therefore, an aperture length LS (=2.0 mm) of the stop 5 in the longitudinal direction is equal to an interval between the marginal rays 85a and 85c. As is apparent from FIG. 2, a tilt angle θ between a line joining the condensing positions 86a, 86b, and 86c and the reflected light beams 85a, 85b, and 85c is equal to an incident angle or an reflection angle on the cylindrical total reflective surface 42.

Therefore, by the aperture length LS of the stop 5 in the longitudinal direction and the tilt angle θ, a distance L between the condensing position 86a closest to the light guide element 4 and the condensing position 86c farthest therefrom in the optical axis direction is expressed by "L=LS×tan θ". In FIG. 2, θ=45°, and hence L=LS.

When the tilt angle θ is made too small, a variation in quantity of light beams passing through the stop 5 is increased by a small amount of shift of the stop 5 in the optical axis direction. When the tilt angle θ is made too large, light beams vignetted by the stop 5 are increased, and hence optical efficiency of the entire system reduces.

As is apparent from FIG. 1, when the incident angle on the cylindrical total reflective surface 42 is made too large in order to increase the tilt angle θ, the one-dimensional array detector 7 interferes with the test subject 3. In contrast to this, when the incident angle on the cylindrical total reflective surface 42 is made too small in order to reduce the tilt angle θ, the diffraction element 6 interferes with the test subject 3.

In view of the optical efficiency and the arrangement as described above, it is desirable to hold the tilt angle θ in a range of 30° to 60°. In this case, the distance L is between "0.58×LS" and "1.73×LS". Therefore, 0.58<L/LS<1.73.

In a more ideal case, it is desirable to hold the tilt angle θ in a range of 35° to 55°. In this case, the distance L is between "0.70×LS" and "1.43×LS". Therefore, 0.70<L/LS<1.43.

The stop 5 is provided between the condensing position 86a closest to the light guide element 4 and the condensing position 86c farthest therefrom, and hence even when the position of the stop 5 is shifted forward and backward in the optical axis direction in a range between the condensing position 86a and the condensing position 86c, there is a condensing position in the aperture of the stop 5. In other words, there are an infinite number of condensing positions between the closest condensing position 86a and the farthest condensing position 86c, and hence a part of the detected light beams is necessarily condensed on the stop regardless of the position of the stop in the optical axis direction.

Therefore, a variation in light quantity due to focal deviation does not occur.

When the position of the test subject 3 (read region 35) is moved in the optical axis direction (upward and downward direction), the condensing position close to the stop 5 which is formed by the light guide element is shifted in the optical axis direction. However, there are an infinite number of condensing positions between the condensing position 86a closest to the light guide element 4 and the condensing position 86c farthest therefrom, and hence a part of the detected light beams is necessarily condensed on the stop. Therefore, a variation in light quantity due to focal deviation does not easily occur.

Figure 4A:
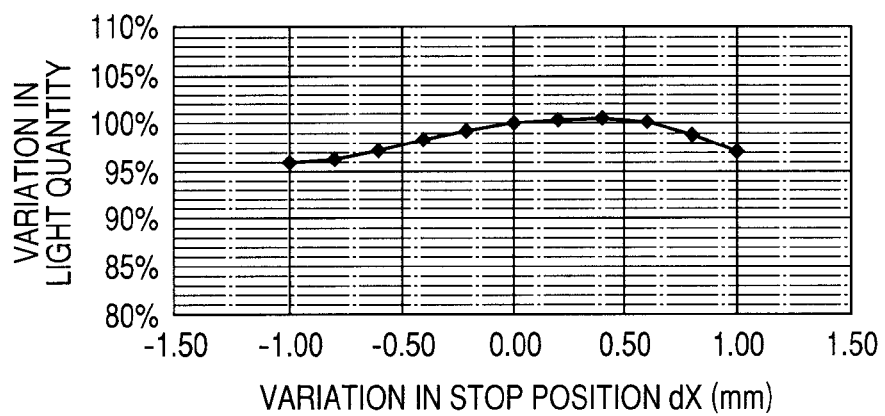
FIGS. 4A and 4B each are an explanatory diagram illustrating a variation in light quantity according to Embodiment 1 of the present invention.
Figure 4B:
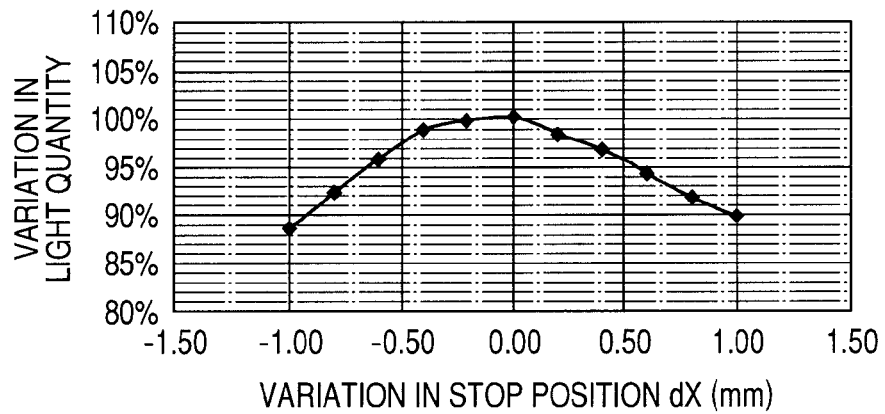

FIGS. 4A and 4B illustrate an effect of this embodiment. In FIG. 4A, the abscissa indicates the amount of variation (dX) in position of the stop 5 in the optical axis direction in the structure according to this embodiment as illustrated in Table 3, and the ordinate indicates the quantity of light which passes through the stop 5 and reaches the diffraction element 6. The light quantity in a case of dX=0 is set as 100% for normalization.

Figure 13:
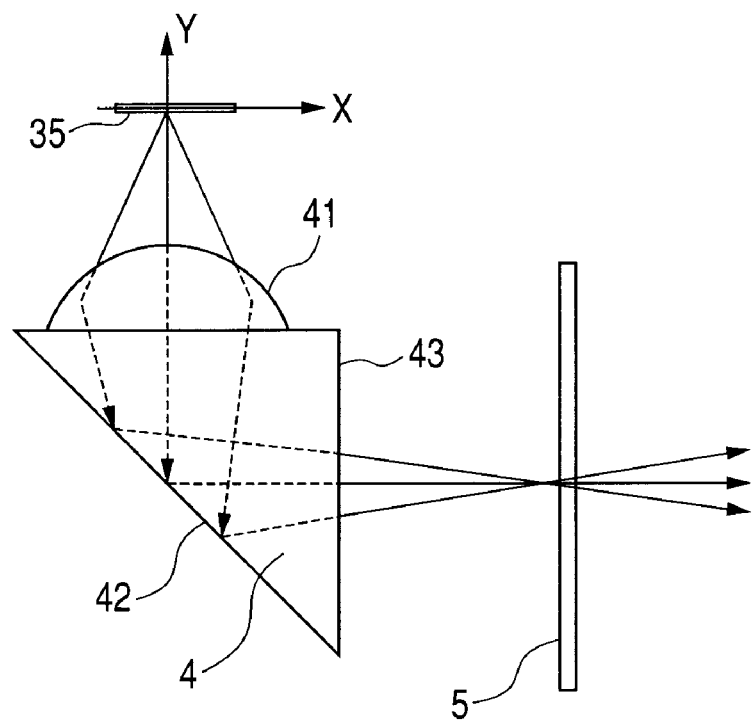
FIG. 13 is an explanatory view illustrating a comparative example of a light guide element.

In a comparative example of this embodiment, a light guide element illustrated in FIG. 13 and Table 4 is assumed. That is, the light guide element has a structure in which the cylindrical total reflective surface 42 is a flat surface and the power of the incident surface 41 is increased to condense the light beams from the read region on the stop 5 in each of the first section and the second section.

TABLE 4

| Specifications of Light Guide Element PMMA | | | |
|---|---|---|---|
| | Surface coordinates | Curvature in paper sheet plane | Curvature in plane orthogonal to paper sheet |
| Read region 35 | (0.0, 0.0) | | ∞ |
| Incident surface 41 | (0.0, −6.2) | | 2.43 |
| Cylindrical total reflective surface 42 | (0.0, −9.0) | ∞ | ∞ |
| Exit surface 43 | (2.1, −9.0) | | ∞ |
| Stop 5 | (4.1, −9.0) | | ∞ |

As illustrated in FIG. 13, the origin (0, 0) is the intersection of the X-axis and the Y-axis. FIG. 4B illustrates a variation in light quantity in the case where the light guide element illustrated in Table 4 is used. In FIG. 4B, the abscissa indicates the amount of variation (dX) in position of the stop 5 in the optical axis direction, and the ordinate indicates the quantity of light which passes through the stop 5 and reaches the diffraction element 6. The light quantity in the case of dX=0 is set as 100% for normalization.

In the comparative example illustrated in FIG. 4B, when the variation in position of the stop is ±1 mm, the light quantity is varied by approximately 11.4%. In contrast to this, in this embodiment illustrated in FIG. 4A, when the variation in position of the stop is ±1 mm, the light quantity is varied by approximately 4.6%. As is apparent from the comparison between FIG. 4A and FIG. 4B, the variation in light quantity may be reduced to approximately 40% by using the structure according to this embodiment.

Figure 5A:
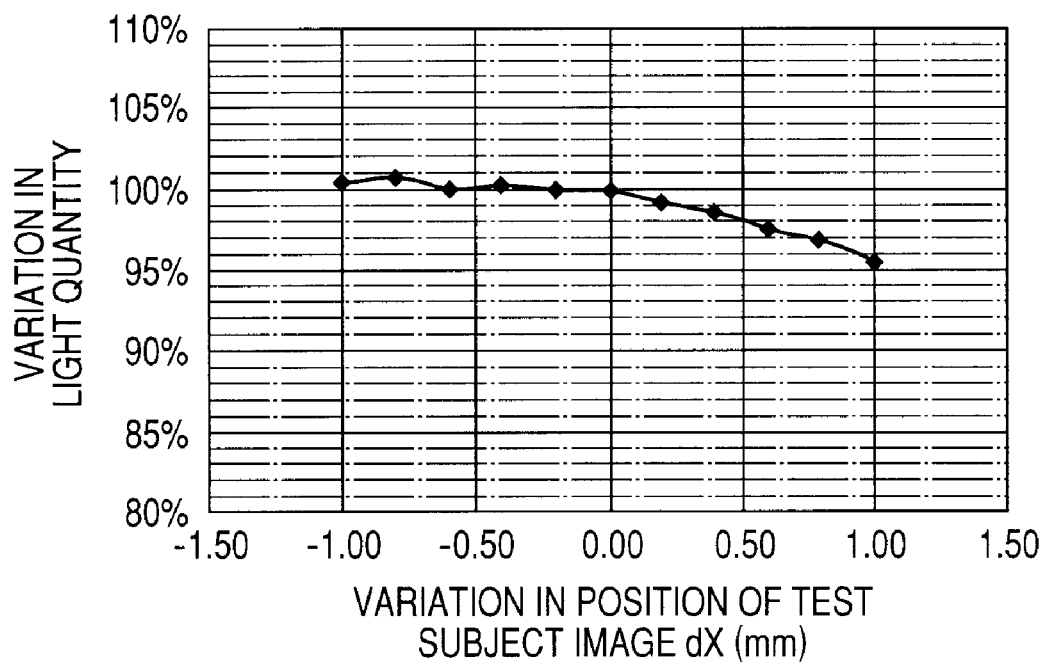
FIGS. 5A and 5B each are an explanatory diagram illustrating a variation in light quantity according to Embodiment 1 of the present invention.
Figure 5B:
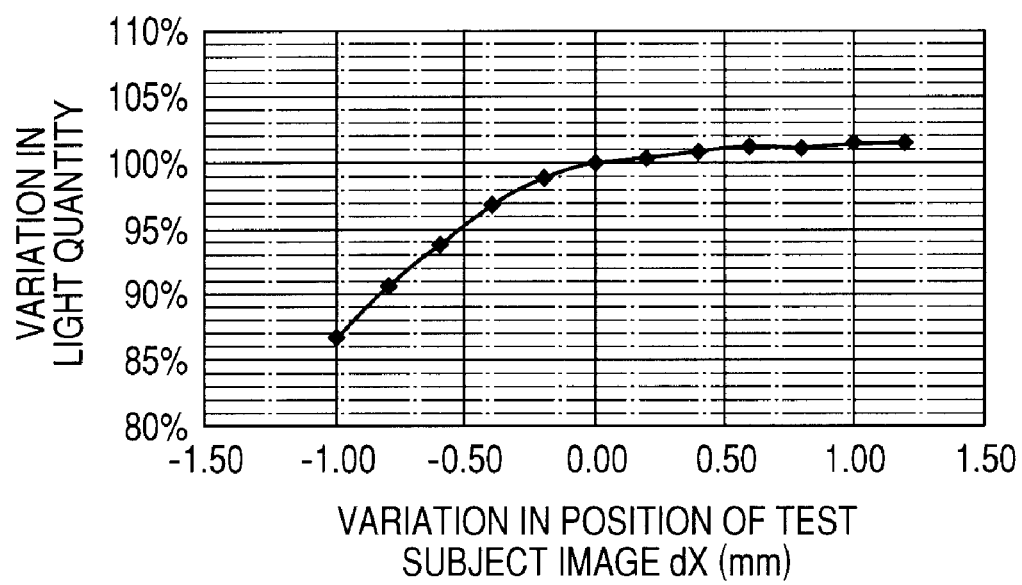
Figure 6A:
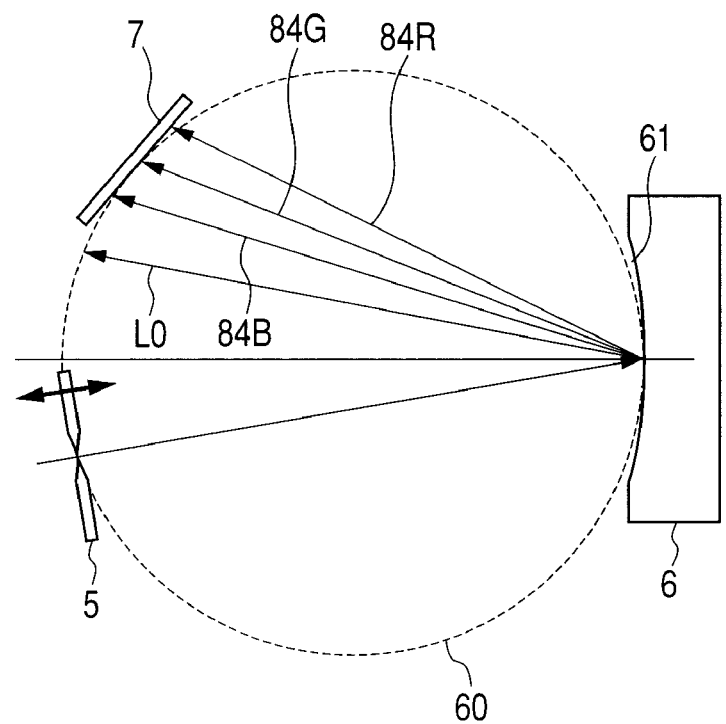
FIG. 6A is a principal sectional view illustrating a spectral optical element in Embodiment 1 of the present invention.
Figure 6B:
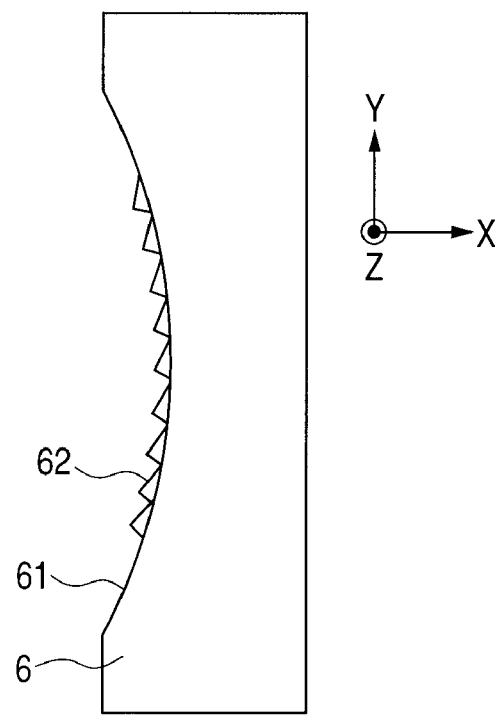
FIG. 6B is a principal sectional view illustrating a concave surface reflection type diffraction element according to Embodiment 1 of the present invention.

Next, FIGS. 5A and 5B illustrate another effect of this embodiment. In FIG. 5A, the abscissa indicates the amount of variation (dX) in position of the test subject 3 (read region 35) in the optical axis direction (upward and downward direction) in the structure according to this embodiment as illustrated in Table 3, and the ordinate indicates the quantity of light which passes through the stop 5 and reaches the diffraction element 6. The light quantity in the case of dX=0 is set as 100% for normalization.

In a comparative example of this embodiment, a light guide element illustrated in Table 4 is assumed. FIG. 5B illustrates a variation in light quantity in the case where the light guide element illustrated in Table 4 is used. In FIG. 5B, the abscissa indicates the amount of variation (dX) in position of the test subject 3 (read region 35) in the optical axis direction (upward and downward direction), and the ordinate indicates the quantity of light which passes through the stop 5 and reaches the diffraction element 6. The light quantity in the case of dX=0 is set as 100% for normalization.

In the comparative example illustrated in FIG. 5B, when the variation in position of the test subject 3 is ±1 mm, the light quantity is varied by approximately 14.9%. In contrast to this, in this embodiment illustrated in FIG. 5A, when the variation in position of the test subject 3 is ±1 mm, the light quantity is varied by approximately 5.2%. As is apparent from the comparison between FIG. 5A and FIG. 5B, the variation in light quantity may be reduced to a little under 40% by using the structure according to this embodiment.

In this embodiment, the Rowland type spectral device is used as the detection optical system. However, the present invention is not limited thereto and may be applied to, for example, a spectral device in which a stop is provided in an incident portion, such as a Czerny-Turner type or a Littrow type. The ultraviolet LED excitation type white LED is used as the illumination optical system. However, the present invention is not limited thereto. For example, an existing light source such as a halogen lamp or a combination of light sources of three colors of R, G, and B may be used.

As described above, in the case where the structure according to this embodiment is employed, even when the stop is adjusted forward and backward to perform focus adjustment, the variation in quantity of received light reaching the array detector, which is caused by the increase or decrease in light beams passing through the stop, may be reduced. Even in the case where there are deviations in alignment precision of the stop and part precision and alignment precision of the light guide element, the variation in quantity of received light reaching the array detector, which is caused by the increase or decrease in light beams passing through the stop, may be reduced. Even when the test subject 3 is moved in the upward and downward direction while being transferred, the variation in quantity of received light reaching the array detector, which is caused by the increase or decrease in light beams passing through the stop, may be reduced.

Therefore, the guiding optical system in this embodiment is used to be able to reduce the variation in quantity of received light reaching the array detector of the detection optical system, and hence the detection precision of the spectral colorimetric device may be improved.

<Embodiment 2>

Figure 7:
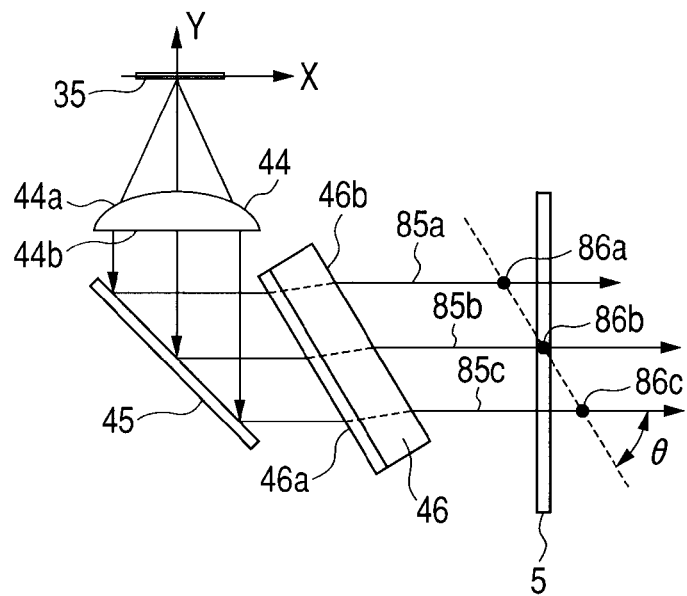
FIG. 7 is an explanatory view illustrating a guiding optical system according to Embodiment 2 of the present invention.

FIG. 7 illustrates a guiding optical system in Embodiment 2. The guiding optical system in Embodiment 2 includes a spherical lens 44, a reflecting mirror 45, a cylindrical lens 46, and the stop 5. The detection optical system after the stop 5 is the same as in Embodiment 1.

Table 5 illustrates specifications of surface position coordinates and curvatures of the respective elements, which are the spherical lens 44, a reflecting mirror 45, the cylindrical lens 46, and the stop 5 in the case where the X- and Y-coordinate systems are defined as in FIG. 7.

Spherical Lens and Cylindrical Lens

TABLE 5

| Guiding Optical System PMMA | | | |
|---|---|---|---|
| | Surface coordinates | Curvature in paper sheet plane | Curvature in plane orthogonal to paper sheet |
| Read region 35 | (0.0, 0.0) | | ∞ |
| Spherical lens incident surface 44a | (0.0, −6.2) | | 3.7 |
| Spherical lens exit surface 44b | (0.0, −7.2) | | ∞ |
| Reflecting mirror 45 | (0.0, −9.0) | | ∞ |
| Cylindrical lens incident surface 46a | (4.0, −9.0) | ∞ | 3 |
| Cylindrical lens exit surface 46b | (5.0, −9.0) | | ∞ |
| Stop 5 | (10.0, −9.0) | | ∞ |

Note that values are in mm. A cover glass (not shown) having a thickness of 0.7 mm is provided between the read region 35 and the incident surface 44a. An aperture width of the stop is set to 60 μm and an aperture length thereof is set to 2 mm. As illustrated in FIG. 7, the origin (0, 0) is the intersection of the X-axis and the Y-axis.

An optical effective area of each optical element is desirably set such that an NA of an exit light beam of the light guide element 4 and an NA of an incident light beam of the spectral detection optical system in the first section are substantially equal to each other, so as to determine a suitable element size for minimizing a light beam energy loss.

In this embodiment, the incident-side NA of the spectral detection optical system in the first section is equal to 0.4, and hence optical effective areas of the spherical lens 44, the reflecting mirror 45, and the cylindrical lens 46 are set such that the incident-side NA of the light guide element is equal to 0.4.

The spherical lens 44 has a condensing action for making reflected light beams from the read region 35 substantially parallel to one another by the incident surface 44a having the convex spherical shape. That is, a front focal position of the incident surface 44a and the read region 35 are substantially aligned with each other. Note that "substantially aligned" means that the read region 35 is provided in a position within ±20% of the front focal length.

As illustrated in FIG. 7, of the reflected light beams from the test subject 3, a principal ray in the paper sheet plane is expressed by reference symbol 85b and marginal rays are expressed by 85a and 85c. The light beams 85a, 85b, and 85c are reflected on the reflecting mirror 45 provided at 45° relative to the light beams in the second section parallel to the sheet paper.

Further, the incident angle on the cylindrical lens 46 is 36°.

The cylindrical lens incident surface 46a is a convex cylindrical surface having a constant curvature in a plane which is orthogonal to the paper sheet. As a result, by the cylindrical lens incident surface 46a, the incident light beams converted into substantially parallel light by the spherical lens 44 are condensed only in the first section orthogonal to the paper sheet and parallel to the optical axis, and bent in the second section parallel to the paper sheet without being subjected to the condensing action in the second cross section.

As described above, the guiding optical system including the spherical lens 44, the reflecting mirror 45, and the cylindrical lens 46 guides, toward the stop 5, the light beams converted into the substantially parallel light by the spherical lens 44 without condensing the light beams in the second section parallel to the paper sheet while maintaining the parallel light. The guiding optical system is configured to have the condensing action by the cylindrical lens 46 in the first section which is orthogonal to the paper sheet and parallel to the optical axis, so as to condense the light beams in the vicinity of the stop 5.

The light beams 85a, 85b, and 85c reflected on the reflecting mirror 45 are subjected to the same condensing action by the cylindrical lens incident surface 46a which is the cylindrical surface having the convex shape. However, distances between the stop 5 and incident points of the respective light beams on the cylindrical lens incident surface 46a are different from one another. Therefore, as illustrated in FIG. 7, condensing positions 86a, 86b, and 86c of the light beams 85a, 85b, and 85c are different from one another.

As illustrated in FIG. 7, the condensing position 86a of the marginal ray 85a is closest to the cylindrical lens 46 and the condensing position 86c of the marginal ray 85c is farthest from the cylindrical lens 46. The stop 5 is provided between the closest condensing position 86a and the farthest condensing position 86c.

The light beams are transmitted toward the stop 5 without being condensed in the second section while maintaining the parallel light. Therefore, an aperture length LS (=2.0 mm) of the stop 5 in the longitudinal direction is equal to an interval between the marginal rays 85a and 85c. As is apparent from FIG. 7, a tilt angle θ between a line joining the condensing positions 86a, 86b, and 86c and the light beams 85a, 85b, and 85c is equal to the an incident angle 36° on the cylindrical lens 46. Therefore, by the aperture length LS of the stop 5 in the longitudinal direction and the tilt angle θ, a distance L between the condensing position 86a closest to the cylindrical lens 46 and the condensing position 86c farthest therefrom in the optical axis direction is expressed by "L=LS×tan θ". In FIG. 7, θ=36°.

When the tilt angle θ is made too small, a variation in quantity of light beams passing through the stop 5 is increased by a small amount of shift of the stop 5 in the optical axis direction. When the tilt angle θ is made too large, light beams vignetted by the stop 5 are increased, and hence optical efficiency of the entire system reduces. Therefore, it is desirable to hold the tilt angle θ in a range of 30° to 60°. In this case, the distance L is between "0.58×LS" and "1.73×LS". Therefore, 0.58<L/LS<1.73. In a more ideal case, it is desirable to hold the tilt angle θ in a range of 35° to 55°. In this case, the distance L is between "0.70×LS" and "1.43×LS". Therefore, 0.70<L/LS<1.43.

The stop 5 is provided between the condensing position 86a closest to the cylindrical lens 46 and the condensing position 86c farthest therefrom, and hence even when the position of the stop 5 is shifted in the optical axis direction in a range between the condensing position 86a and the condensing position 86c, there is a condensing position in any location of the stop 5. In other words, there are an infinite number of condensing positions between the closest condensing position 86a and the farthest condensing position 86c, and hence a part of the detected light beams is necessarily condensed on the stop regardless of the position of the stop in the optical axis direction. Therefore, a variation in light quantity due to focal deviation does not occur.

When the position of the test subject 3 is moved in the optical axis direction (upward and downward direction), the condensing position close to the stop 5 which is formed by the guiding optical system is shifted in the optical axis direction. However, there are an infinite number of condensing positions between the closest condensing position 86a and the farthest condensing position 86c, and hence a part of the detected light beams is necessarily condensed on the stop. Therefore, a variation in light quantity due to focal deviation does not easily occur.

Figure 8:
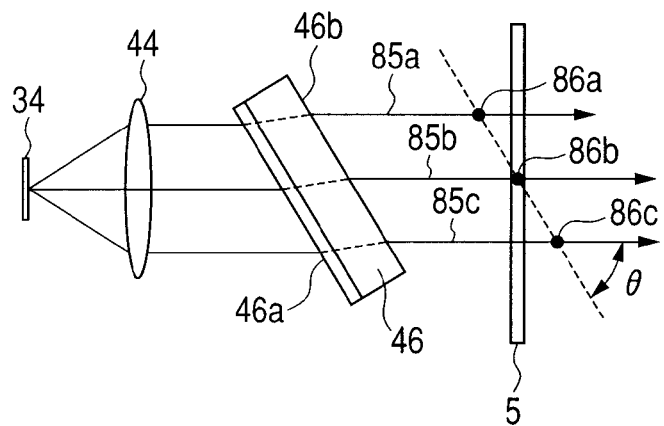
FIG. 8 is an explanatory view illustrating a modified example of the guiding optical system according to Embodiment 2 of the present invention.

FIG. 8 illustrates a modified example of the guiding optical system illustrated in FIG. 7. In FIG. 8, the reflecting mirror 45 illustrated in FIG. 7 is omitted and the reflected light beams from the read region 35 are guided to the stop 5 without bending the optical path. The actions of the spherical lens 44 and the cylindrical lens 46 are the same as in the structure illustrated in FIG. 7, and hence the guiding optical system in which the number of parts is reduced to lower the cost can be realized.

As described above, in the case where the structure according to this embodiment is employed, even when the stop is moved forward and backward to perform focus adjustment, the variation in quantity of received light reaching the array detector, which is caused by the increase or decrease in light beams passing through the stop, may be reduced.

Even in the case of deviations in alignment precision of the stop and part precision and alignment precision of the light guide element, the variation in quantity of received light reaching the array detector, which is caused by the increase or decrease in light beams passing through the stop, may be reduced. Even when the test subject 3 is moved in the upward and downward direction while being transferred, the variation in quantity of received light reaching the array detector, which is caused by the increase or decrease in light beams passing through the stop, may be reduced.

Therefore, the guiding optical system in this embodiment is used to be able to reduce the variation in quantity of received light reaching the array detector of the detection optical system, and hence the detection precision of the spectral colorimetric device may be improved.

<Embodiment 3>

Figure 9:
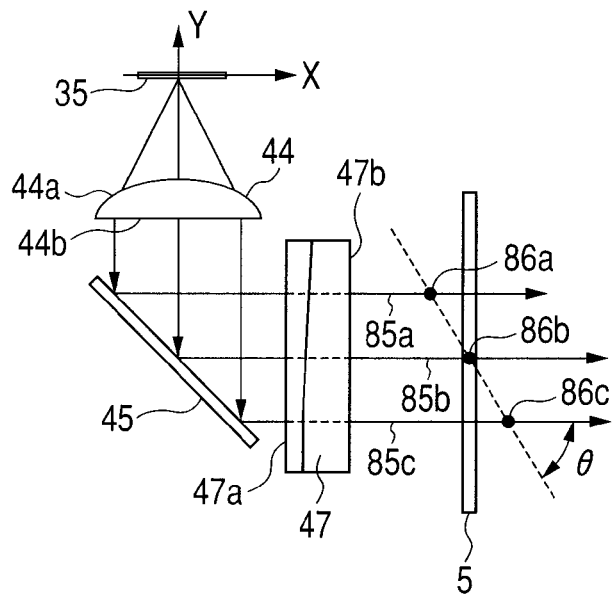
FIG. 9 is an explanatory view illustrating a guiding optical system according to Embodiment 3 of the present invention.

FIG. 9 illustrates a guiding optical system in Embodiment 3. The guiding optical system in Embodiment 3 includes the spherical lens 44, the reflecting mirror 45, a specific cylindrical lens 47, and the stop 5. The detection optical system after the stop 5 is the same as in Embodiment 1.

Table 6 illustrates specifications of surface position coordinates and curvatures of the respective elements, which are the spherical lens 44, the reflecting mirror 45, the specific cylindrical lens 47, and the stop 5 in the case where the X- and Y-coordinate systems are defined as in FIG. 9.

Spherical Lens and Cylindrical Lens

TABLE 6

| Guiding Optical System PMMA | | | |
|---|---|---|---|
| | Surface coordinates | Curvature in paper sheet plane | Curvature in plane orthogonal to paper sheet |
| Read region 35 | (0.0, 0.0) | | ∞ |
| Spherical lens incident surface 44a | (0.0, −6.2) | | 3.7 |
| Spherical lens exit surface 44b | (0.0, −7.2) | | ∞ |

TABLE 6-continued

Guiding Optical System PMMA

| | Surface coordinates | Curvature in paper sheet plane | Curvature in plane orthogonal to paper sheet |
|---|---|---|---|
| Reflecting mirror 45 | (0.0, −9.0) | ∞ | |
| Cylindrical lens incident surface 46a | (4.0, −9.0) | ∞ | 3.0 to 4.0 |
| Cylindrical lens exit surface 46b | (5.0, −9.0) | ∞ | |
| Stop 5 | (10.0, −9.0) | ∞ | |

Note that values are in mm. A cover glass (not shown) having a thickness of 0.7 mm is provided between the read region 35 and the incident surface 41. An aperture width of the stop is set to 60 μm and an aperture length thereof is set to 2 mm. As illustrated in FIG. 9, the origin (0, 0) is the intersection of the X-axis and the Y-axis.

The stop 5 includes a rectangular aperture and has a length of 60 μm in the lateral direction and a length of 2 mm in the longitudinal direction.

Optical effective areas of the spherical lens 44, the reflecting mirror 45, and the cylindrical lens 47 are set such that an exit side NA of light beams emerged from an exit surface 47b of the cylindrical lens 47 in the first section is substantially equal to 0.4 which is the NA of the detection optical system. Note that "substantially equal" means ±20%.

The spherical lens 44 has a condensing action for making reflected light beams from the read region 35 substantially parallel to one another by the incident surface 44a having the convex spherical shape. That is, a front focal position of the incident surface 44a and the read region 35 are substantially aligned with each other. Note that "substantially aligned" means that the read region 35 is provided in a position within ±20% of the front focal length.

As illustrated in FIG. 9, of the reflected light beams from the test subject 3, a principal ray in the paper sheet plane is expressed by reference symbol 85b and marginal rays are expressed by 85a and 85c. The light beams 85a, 85b, and 85c are reflected on the reflecting mirror 45 provided at 45° relative to the light beams in the first section parallel to the sheet paper.

The cylindrical lens 47 is disposed facing squarely to the incident light beams (not tilted as illustrated in FIG. 7).

A cylindrical lens incident surface (anamorphic optical surface) 47a is a specific cylindrical surface with a convex shape having a curvature in the plane which is orthogonal to the paper sheet and parallel to the optical axis. The specific cylindrical surface has different curvatures depending on the meridional direction of the cylindrical surface, that is, the specific cylindrical surface is a cone surface. To be specific, a curvature in the vicinity of the principal ray 85b is set to 3.5 mm, a curvature in the vicinity of the marginal ray 85a is set to 3.0 mm, and a curvature in the vicinity of the marginal ray 85c is set to 4.0 mm.

As a result, the incident light beams converted into substantially parallel light by the spherical lens 44 are condensed in the first section which is orthogonal to the paper sheet and parallel to the optical axis, and bent in the second section parallel to the paper sheet without being subjected to the condensing action in the first section.

As described above, the guiding optical system including the spherical lens 44, the reflecting mirror 45, and the cylindrical lens 47 guides, toward the stop 5, the light beams converted into the substantially parallel light by the spherical lens 44 without condensing the light beams in the second section parallel to the paper sheet while maintaining the parallel light. The guiding optical system is configured to have the condensing action by the cylindrical lens 47 in the first section which is orthogonal to the paper sheet and parallel to the optical axis, so as to condense the light beams in the vicinity of the stop 5.

The light beams 85a, 85b, and 85c reflected on the reflecting mirror 45 are subjected to different condensing action by the specific cylindrical surface 47a which is the cylindrical lens incident surface 47a having the concave shape cylindrical surface. Therefore, as illustrated in FIG. 9, condensing positions 86a, 86b, and 86c of the light beams 85a, 85b, and 85c are different from one another.

As illustrated in FIG. 9, the condensing position 86a of the marginal ray 85a is closest to the cylindrical lens 47 and the condensing position 86c of the marginal ray 85c is farthest from the cylindrical lens 47. The stop 5 is provided between the closest condensing position 86a on the forward side and the farthest condensing position 86c.

The light beams are condensed at the condensing positions 86a and 86c at a position ±1.0 mm with respect to the condensing position 86b, due to the curvature of the above-mentioned specific cylindrical surface 47a. In other words, the condensing positions 86a and 86c are apart from each other by a distance L of 2 mm in the optical axis direction.

The light beams are transmitted toward the stop 5 without being condensed in the second section while maintaining the parallel light. Therefore, an aperture length LS (=2.0 mm) of the stop 5 is equal to an interval between the marginal rays 85a and 85c in the optical axis direction, and is 2.0 mm. Therefore, a tilt angle θ between a line joining the condensing positions 86a, 86b, and 86c and the light beams 85a, 85b, and 85c is obtained θ=45° from "L=LS×tan θ", which represents the relation of the length LS of the stop 5 in the longitudinal direction, the tilt angle θ, and a distance L=2.0 mm between the condensing position 86a on the foremost side and the condensing position 86c on the rearmost side in the optical axis direction.

When the tilt angle θ is made too small, a variation in quantity of light beams passing through the stop is increased by a small amount of shift of the stop 5 in the optical axis direction. When the tilt angle θ is made too large, light beams vignetted by the stop 5 are increased, and hence optical efficiency of the entire system reduces.

Therefore, it is desirable to hold the tilt angle θ in a range of 30° to 60°. In this case, the distance L is between "0.58× LS" and "1.73×LS". Therefore, the curvature of the specific cylindrical surface 47a may be set so as to be 0.58<L/LS<1.73.

In a more ideal case, it is desirable to hold the tilt angle θ in a range of 35° to 55°. In this case, the distance L is between "0.70×LS" and "1.43×LS". Therefore, the curvature of the specific cylindrical surface 47a may be set so as to be 0.70<L/LS<1.43.

The stop 5 is provided between the condensing position 86a closest to the cylindrical lens 47 and the condensing position 86c farthest therefrom, and hence even when the position of the stop 5 is shifted forward and backward in the optical axis direction in a range between the condensing position 86a and the condensing position 86c, there is a condensing position in the stop 5.

In other words, there are an infinite number of condensing positions between the closest condensing position 86a and the farthest condensing position 86c, and hence a part of the detected light beams is necessarily condensed on the stop regardless of the position of the stop in the optical axis direction. Therefore, a variation in light quantity due to focal deviation does not occur.

When the position of the test subject 3 is moved in the optical axis direction (upward and downward direction), the condensing position close to the stop 5 which is formed by the guiding optical system is shifted in the optical axis direction. However, there are an infinite number of condensing positions between the closest condensing position 86a and the farthest condensing position 86c, and hence a part of the detected light beams is necessarily condensed on the stop. Therefore, a variation in light quantity due to focal deviation does not easily occur.

Figure 10:
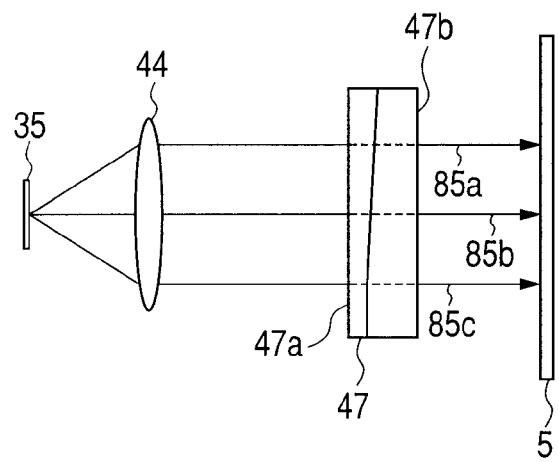
FIG. 10 is an explanatory view illustrating a modified example of the guiding optical system according to Embodiment 3 of the present invention.

FIG. 10 illustrates a modified example of the guiding optical system illustrated in FIG. 9. Unlike the example illustrated in FIG. 9, in the modified example illustrated in FIG. 10, the reflecting mirror 45 is not provided and the reflected light beams from the detection region 35 are guided to the stop 5 without bending the optical path. The actions of the spherical lens 44 and the cylindrical lens 47 are the same as in the structure illustrated in FIG. 9, and hence the guiding optical system in which the number of parts is reduced to lower the cost is realized.

In the case where the structure according to this embodiment is employed as described above, even when the stop is moved forward and backward to perform focus adjustment, the variation in quantity of received light reaching the array detector, which is caused by the increase or decrease in light beams passing through the stop, may be reduced. Even in the case of deviations in alignment precision of the stop and part precision and alignment precision of the light guide element, the variation in quantity of received light reaching the array detector, which is caused by the increase or decrease in light beams passing through the stop, may be reduced. Even when the test subject 3 is moved in the upward and downward direction while being transferred, the variation in quantity of received light reaching the array detector, which is caused by the increase or decrease in light beams passing through the stop, may be reduced.

Therefore, the guiding optical system in this embodiment is used to be able to reduce the variation in quantity of received light reaching the array detector of the detection optical system, and hence the detection precision of the spectral colorimetric device may be improved.

<Embodiment 4>

Figure 11:
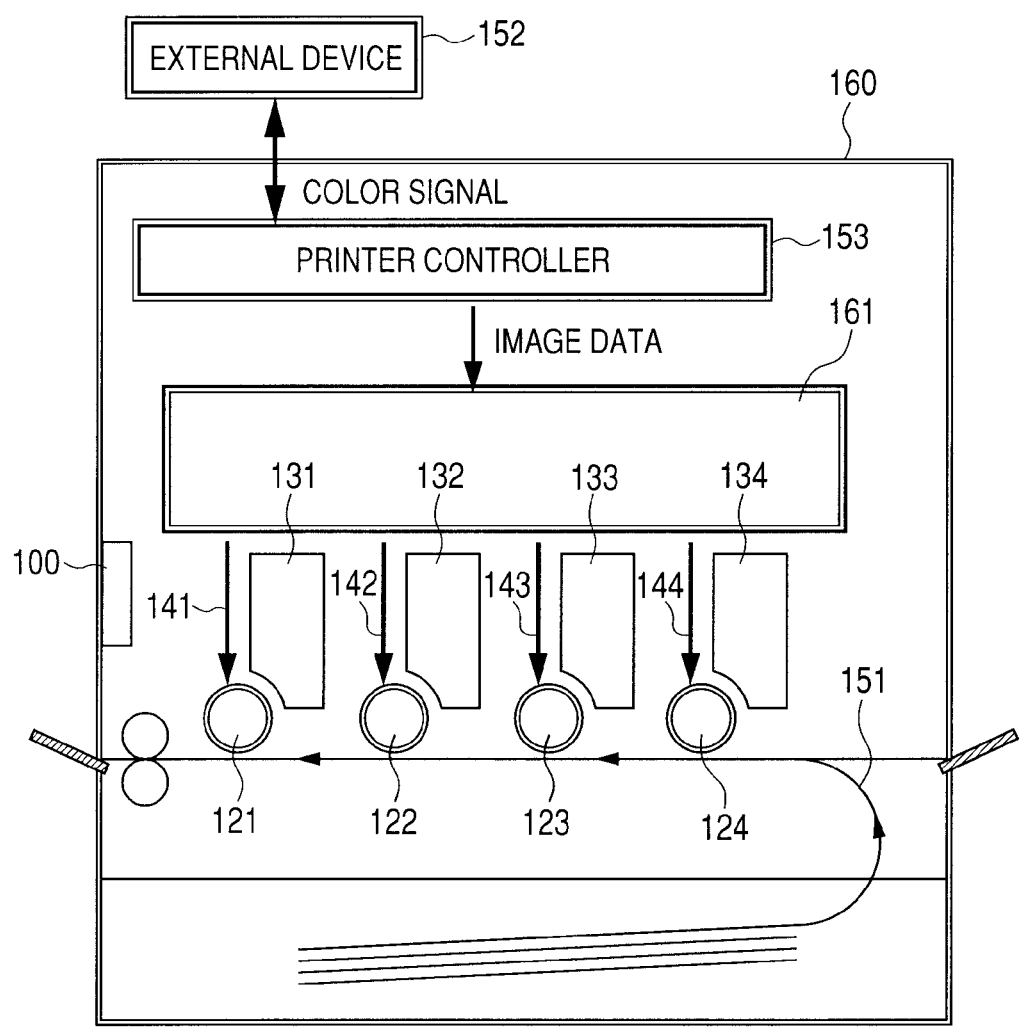
FIG. 11 is a principal sectional diagram illustrating a structural example of a color image forming apparatus using the spectral colorimetric apparatus according to the present invention.
Figure 12:
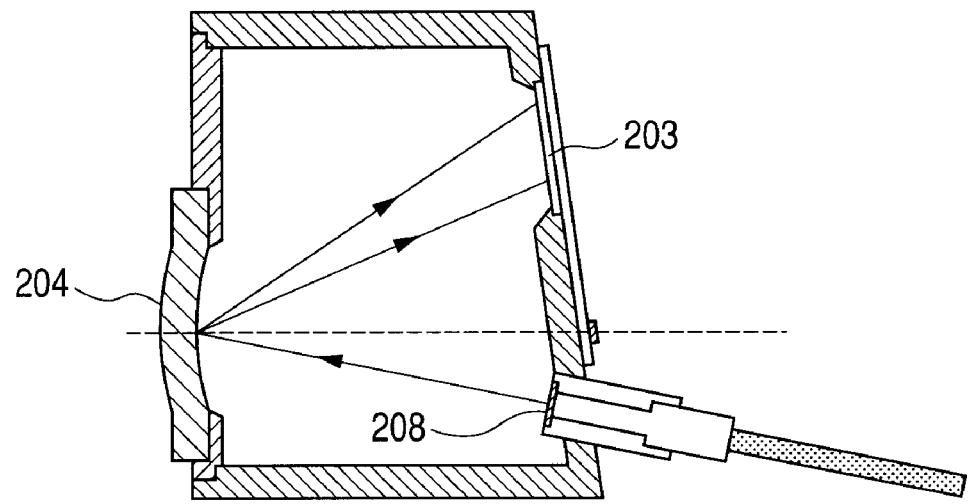
FIG. 12 illustrates a conventional spectral colorimetric sensor.

FIG. 11 is a principal schematic diagram illustrating a color image forming apparatus according to an embodiment of the present invention. This embodiment illustrates a tandem type color image forming apparatus, in which four photosensitive drums are arranged each serving as an image bearing member, and includes an optical scanning apparatus 161 for recording image information to each photosensitive drum by four laser light beams. The color image forming apparatus includes a color image forming apparatus 160, the optical scanning apparatus 161, photosensitive drums 121, 122, 123, and 124 each serving as the image bearing member, developing devices 131, 132, 133, and 134, an intermediate transport belt 151, and a fixing device (not shown).

In FIG. 11, respective color signals of red (R), green (G), and blue (B) are input from an external device 152, such as a personal computer, to the color image forming apparatus 160. The color signals are converted into each image data (dot data) of cyan (C), magenta (M), yellow (Y), and black (K) by a printer controller 153 in the color image forming apparatus. The image data are separately input to the optical scanning apparatus 161. A known apparatus, for example, an optical scanning apparatus which includes a single deflector and scanning optical systems provided so as to be opposed to each other on both sides of the deflector may be used as the optical scanning apparatus 161 scanning the multiple surfaces to be scanned (photosensitive drums). Alternatively, the optical scanning apparatus 161 may arrange four separate optical scanning apparatus corresponding to the respective colors of cyan (C), magenta (M), yellow (Y), and black (K), and may record image information to each photosensitive drum and print color images rapidly.

Light beams 141, 142, 143, and 144 modulated based on respective image data are emitted from the optical scanning apparatus 161. Photosensitive surfaces of the photosensitive drums 121, 122, 123, and 124 are scanned with the light beams in the main scanning direction.

According to the color image forming apparatus according to this embodiment, as described above, latent images of the respective colors are formed on the corresponding surfaces of the photosensitive drums 121, 122, 123, and 124 using the light beams based on the respective image data from the four optical scanning apparatus 161. After that, the latent images are developed by the respective developing devices and the multi-transfer of the respective colors on the intermediate transport belt is performed. Then, the image is transferred to a recording material and formed on the recording material by the fixing device.

In the image forming apparatus, a spectral colorimetric apparatus 100 for chromaticity detection is provided immediately after the fixing device on a conveying path of the recording material and opposed to the image forming surface of the recording material. The spectral colorimetric apparatus 100 has the structure described in Embodiment 1. The spectral colorimetric apparatus detects chromaticity of a color patch which is formed on and fixed onto the recording material by the image forming apparatus. The chromaticity of the color patch fixed onto the recording material is measured because color matching is then performed in view of a change in chromaticity due to fixing. The result obtained by the detection is transferred to the printer controller which is control unit. The printer controller determines whether or not the output color reproduction of the single-color patch is appropriate. When a chromaticity difference between chromaticity of the output single-color patch and chromaticity instructed by the printer controller is within a predetermined range, the color calibration is completed. When the chromaticity difference is outside the predetermined range, the printer controller performs the color calibration which corrects the image signal based on the chromaticity information until the chromaticity difference falls within the predetermined range.

As describe above, when the color sensor according to the present invention is introduced to an image forming apparatus, a higher degree of calibration may be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-110878, filed Apr. 30, 2009, and Japanese Patent Application No. 2010-081566, filed Mar. 31, 2010, which are hereby incorporated by reference herein in their entirety.

What is claimed is:

1. A spectral colorimetric apparatus for detecting a color of an image of a test subject illuminated, comprising:
   a stop;
   a spectral detection optical system for spectrally detecting a light beam which is diffused in the test subject and passes through the stop; and
   a guiding optical system for guiding, toward the stop, the light beam diffused in the test subject,
   wherein condensing positions of the light beam condensed by the guiding optical system change depending on a position in a direction orthogonal to a first section which is a section including an optical axis of the guiding optical system,
   wherein the stop is disposed between a condensing position closest to the guiding optical system and a condensing position farthest from the guiding optical system, of condensing positions, in the first section, of the light beam condensed by the guiding optical system, in a direction of the optical axis of the guiding optical system, and
   wherein in a second section orthogonal to the first section and parallel to the optical axis, the guiding optical system includes an anamorphic optical surface in which a power in the first section is larger than a power in the second section.

2. A spectral colorimetric apparatus according to claim 1, wherein the anamorphic optical surface of the guiding optical system comprises a cone surface in which a curvature in the first section changes along a longitudinal direction of the stop.

3. A spectral colorimetric apparatus according to claim 1, wherein:
   the anamorphic optical surface of the guiding optical system comprises a cylindrical surface having a constant curvature in the first section; and
   the anamorphic optical surface is tilted relative to a light beam entering the anamorphic optical surface in the second section.

4. A spectral colorimetric apparatus according to claim 1, wherein the following condition is satisfied:

$$0.58 < L/LS < 1.73,$$

where L (mm) indicates a distance between a condensing position closest to the guiding optical system and a condensing position farthest from the guiding optical system, of condensing positions, in the first section, of the light beam condensed by the guiding optical system, in the direction of the optical axis of the guiding optical system, and LS (mm) indicates a length of the stop in a longitudinal direction.

5. A spectral colorimetric apparatus according to claim 1, wherein:
   the guiding optical system has a power in a second section which is parallel to a longitudinal direction of the stop and the optical axis of the guiding optical system, smaller than a power in a first section which is orthogonal to the longitudinal direction of the stop;
   condensing positions of the light beam condensed by the guiding optical system in the first section change depending on a position in the longitudinal direction of the stop; and
   the stop is disposed between a condensing position closest to the guiding optical system and a condensing position farthest from the guiding optical system, of condensing positions, in the first section, of the light beam condensed by the guiding optical system in the direction of the optical axis of the guiding optical system.

6. A color image forming apparatus, comprising:
   the spectral colorimetric apparatus according to claim 5; and
   a control unit for correcting an image signal based on a detection result obtained by the spectral colorimetric apparatus.

7. A spectral colorimetric apparatus according to claim 1, further comprising:
   an illumination optical system for illuminating the test subject; and
   an analyzing unit, wherein:
   the spectral detection optical system comprises:
      a spectral optical element for spectrally separating the light beam passing through the stop; and
      a one-dimensional array light receiving element for receiving the spectral light beam from the spectral optical element;
   the one-dimensional array light receiving element detects a spectral intensity of the spectral light beam in a predetermined wavelength range and converts the spectral intensity into an electrical signal; and
   the analyzing unit obtains chromaticity of the test subject based on the detected spectral intensity.

8. A spectral colorimetric apparatus for detecting a color of an image of a test subject illuminated, comprising:
   a stop;
   a spectral detection optical system for spectrally detecting a light beam which is diffused in the test subject and passes through the stop; and
   a guiding optical system for guiding, toward the stop, the light beam diffused in the test subject,
   wherein condensing positions of the light beam condensed by the guiding optical system change depending on a position in a direction orthogonal to a first section which is a section including an optical axis of the guiding optical system,
   wherein the stop is disposed between a condensing position closest to the guiding optical system and a condensing position farthest from the guiding optical system, of condensing positions, in the first section, of the light beam condensed by the guiding optical system, in a direction of the optical axis of the guiding optical system, and
   wherein the guiding optical system comprises a light guide element integrally including an incident refractive surface, a total reflective surface, and an exit refractive surface, which are provided in order from the test subject.

9. A spectral colorimetric apparatus according to claim 8, wherein the total reflective surface comprises an anamorphic reflective surface in which a power in the first section is larger than a power in the second section.

10. A spectral colorimetric apparatus according to claim 8, wherein the incident refractive surface has a power larger than a power of the exit refractive surface.

11. A spectral colorimetric apparatus according to claim 8, wherein the test subject is located in a front focal position of the incident refractive surface.

12. A spectral colorimetric apparatus according to claim 8, wherein:
   the guiding optical system has a power in a second section which is parallel to a longitudinal direction of the stop and the optical axis of the guiding optical system, smaller than a power in a first section which is orthogonal to the longitudinal direction of the stop;

condensing positions of the light beam condensed by the guiding optical system in the first section change depending on a position in the longitudinal direction of the stop; and the stop is disposed between a condensing position closest to the guiding optical system and a condensing position farthest from the guiding optical system, of condensing positions, in the first section, of the light beam condensed by the guiding optical system in the direction of the optical axis of the guiding optical system.

13. A color image forming apparatus, comprising:

the spectral colorimetric apparatus according to claim 12; and a control unit for correcting an image signal based on a detection result obtained by the spectral colorimetric apparatus.

14. A spectral colorimetric apparatus according to claim 8, further comprising:

an illumination optical system for illuminating the test subject; and an analyzing unit, wherein:

the spectral detection optical system comprises:
- a spectral optical element for spectrally separating the light beam passing through the stop; and
- a one-dimensional array light receiving element for receiving the spectral light beam from the spectral optical element;

the one-dimensional array light receiving element detects a spectral intensity of the spectral light beam in a predetermined wavelength range and converts the spectral intensity into an electrical signal; and the analyzing unit obtains chromaticity of the test subject based on the detected spectral intensity.

* * * * *